(12) United States Patent
Engels et al.

(10) Patent No.: US 11,469,014 B2
(45) Date of Patent: Oct. 11, 2022

(54) ELECTRICAL DEVICE HAVING AN INSERTABLE HIGH-VOLTAGE BUSHING

(71) Applicant: Siemens Energy Global GmbH & Co. KG, Munich (DE)

(72) Inventors: Engelbert Engels, Cologne (DE); Friedemann Kleinfeld, Cologne (DE); Achim Langens, Lohmar (DE); Tim Schnitzler, Kreuzau (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 411 days.

(21) Appl. No.: 16/634,431

(22) PCT Filed: Jun. 29, 2018

(86) PCT No.: PCT/EP2018/067527
§ 371 (c)(1),
(2) Date: Jan. 27, 2020

(87) PCT Pub. No.: WO2019/020311
PCT Pub. Date: Jan. 31, 2019

(65) Prior Publication Data
US 2020/0258661 A1   Aug. 13, 2020

(30) Foreign Application Priority Data

Jul. 27, 2017  (DE) .......................... 102017212977

(51) Int. Cl.
*H01B 17/28* (2006.01)
*H01B 17/58* (2006.01)
(Continued)

(52) U.S. Cl.
CPC ......... *H01B 17/583* (2013.01); *H01B 7/0225* (2013.01); *H01B 17/28* (2013.01);
(Continued)

(58) Field of Classification Search
CPC ...... H01B 17/28; H01B 17/26; H01B 17/325; H01F 27/04; H01F 27/2828; H01F 27/02;
(Continued)

(56) References Cited

U.S. PATENT DOCUMENTS 3,588,319 A * 6/1971 Isogai et al. ........... H01B 17/28
174/31 R
3,604,830 A * 9/1971 Frakes ................... H01B 17/34
174/31 R
(Continued)

FOREIGN PATENT DOCUMENTS

DE        4227410 C1    11/1993
DE       19644483 C1    11/1997
(Continued)

*Primary Examiner* — Angel R Estrada
(74) *Attorney, Agent, or Firm* — Laurence A. Greenberg; Werner H. Stemer; Ralph E. Locher

(57) ABSTRACT

An insertable high-voltage bushing includes an inner conductor which extends in a longitudinal direction between a high-voltage terminal and a plug-in section of the high-voltage bushing. The plug-in section is configured for the insertion of the high-voltage bushing into a device connection part of an electrical device. An insulating body at least partially extends around the inner conductor. A housing at least partially extends around the outside of insulating body. The housing includes a tubular housing element which extends between a head fitting at the high-voltage terminal of the high-voltage bushing and a mounting flange for fastening the high-voltage bushing to a device housing of the electrical device. The housing element is made of a composite material and a secondary insulation provided between the housing element and the insulating body is formed of a dry foam.

11 Claims, 3 Drawing Sheets

(51) Int. Cl.
*H01B 7/02* (2006.01)
*H01B 17/32* (2006.01)
*H01F 27/04* (2006.01)
*H01R 13/52* (2006.01)
*H01F 27/40* (2006.01)

(52) U.S. Cl.
CPC .............. *H01B 17/32* (2013.01); *H01F 27/04* (2013.01); *H01R 13/5219* (2013.01); *H01F 27/402* (2013.01)

(58) Field of Classification Search
CPC ......... H01F 27/29; H01F 41/10; H01R 13/53; H01R 4/70; H02G 15/072; H02G 15/02; H01H 9/02; H01H 9/0264; H01H 85/185
USPC ......... 174/152 R, 142, 152 G, 153 G, 138 R, 174/139, 138 F, 137 R, 5 R, 14 BH; 16/2.1, 2.2
See application file for complete search history.

(56) References Cited

U.S. PATENT DOCUMENTS

| | | | | |
|---|---|---|---|---|
| 4,431,859 | A * | 2/1984 | Kishida | H01B 17/36 174/209 |
| 7,262,367 | B2 * | 8/2007 | Donzel | H01B 17/42 174/152 R |
| 8,455,763 | B2 * | 6/2013 | Dais | H01F 27/04 174/152 R |
| 8,492,656 | B2 * | 7/2013 | Martinez | H01B 17/265 174/152 R |
| 8,637,773 | B2 * | 1/2014 | Jonsson | B29C 70/66 174/152 R |
| 8,861,165 | B2 * | 10/2014 | Kampe | H01B 17/16 174/18 |
| 8,969,729 | B2 * | 3/2015 | Jahnel | H01B 17/26 174/650 |
| 9,837,184 | B2 | 12/2017 | Juntermanns et al. | |
| 9,947,442 | B2 | 4/2018 | Engels et al. | |
| 10,283,242 | B2 * | 5/2019 | Sumimoto | H01B 17/26 |
| 11,289,243 | B2 * | 3/2022 | Langens | H01B 17/28 |
| 2011/0286145 | A1 | 11/2011 | Langens et al. | |
| 2013/0233617 | A1 | 9/2013 | Engels et al. | |
| 2016/0379736 | A1 | 12/2016 | Juntermanns et al. | |

FOREIGN PATENT DOCUMENTS

| | | |
|---|---|---|
| DE | 10005164 A1 | 8/2001 |
| DE | 102007022641 A1 | 11/2008 |
| DE | 102009007583 A1 | 8/2010 |
| DE | 102012203712 A1 | 9/2013 |
| DE | 102015211939 A1 | 12/2016 |
| EP | 10005164 A1 | 8/2001 |
| EP | 2431982 A1 | 3/2012 |
| EP | 2431982 B1 | 11/2014 |
| EP | 3109867 A1 | 12/2016 |
| EP | 3229242 A1 | 10/2017 |
| WO | 9819195 A1 | 5/1998 |
| WO | 0159467 A1 | 8/2001 |
| WO | 2017101992 A1 | 6/2017 |

* cited by examiner

ELECTRICAL DEVICE HAVING AN INSERTABLE HIGH-VOLTAGE BUSHING

BACKGROUND OF THE INVENTION

Field of the Invention

The invention relates to an insertable high-voltage bushing having an inner conductor which extends in a longitudinal direction between a high-voltage terminal and a plug-in section of the high-voltage bushing, wherein the plug-in section is configured to plug the high-voltage bushing into a device connection part of an electrical device, an insulating body which at least partially surrounds the inner conductor, and a housing which partially surrounds the insulating body to the exterior.

In general, the function of a high-voltage bushing of this type is to insulate the inner conductor of the high-voltage bushing which, during the operation of said high-voltage bushing, assumes a high-voltage potential, from an environment which is at a ground potential, for example a wall of an electrical device. To this end, the inner conductor is fed through the insulating body.

A high-voltage bushing of the above-mentioned type is known from DE 10 2007 022 641 A1. Herein, a transformer is disclosed, the housing of which comprises a device connection part, into which a high-voltage bushing is insertable for the connection of the transformer to a high voltage grid. By the employment of an insertable high-voltage bushing of this type, it is possible for the transformer, with the high-voltage bushing, to be developed and brought into service with a relatively low complexity of assembly.

The plug-in section of the high-voltage bushing and the device connection part are configured such that a reliable electrical contact can be constituted between the inner conductor of the high-voltage bushing and the device connection part, wherein the device connection part is electrically connected to further elements of the electrical device such as, for example, an active part of the electrical device which is arranged within the housing. At the same time, the connection at the contact surfaces between the device connection part and the plug-in section is sufficiently dielectrically strengthened to permit operation at a high-voltage level.

For the production of the insulating body, insulating layers of paper are customarily wound around the inner conductor. In order to enhance the mechanical stability of the high-voltage bushing, the insulating body constituted of wound paper layers is customarily enclosed in an outer housing. In known applications, an interspace between the insulating body which, in many cases, is also described as the active part, and the housing is filled with a fluid insulating medium such as, for example, an insulating oil. In the event of mechanical damage to the housing, the insulating medium can escape from the housing, thereby potentially resulting in unwanted environmental pollution.

SUMMARY OF THE INVENTION

The object of the invention is the proposal of a high-voltage bushing of the above-mentioned type having the best possible dielectric properties, and which simultaneously provides the greatest possible mechanical stability.

In a generic high-voltage bushing, this object is fulfilled, according to the invention, in that the housing comprises a tubular housing element, which extends between the high-voltage terminal of the high-voltage bushing and a mounting flange for mounting the high-voltage bushing on a device housing of the electrical device, wherein the housing element is formed of a composite material, and wherein a secondary insulation is provided between the housing element and the insulating body, which comprises a dry foam.

According to the invention it is proposed that, by a combination of a particularly stable external housing and a secondary insulation which incorporates no fluid insulating medium, a particularly high mechanical stability of the active part of the high-voltage bushing is advantageously achieved. A further advantage is provided in that any environmental pollution associated with an escaping insulating medium is eliminated, or at least reduced. The housing element is preferably comprised of a glass fiber-reinforced plastic, as a result of which a particularly high stability is ensured. According to a particularly simple variant of the invention, the housing element can comprise a tube of said glass fiber-reinforced plastic. An outer shielding which comprises, for example, an annular silicone shield, can further be applied to the tubular housing element.

The high-voltage bushing can appropriately comprise a head fitting on the high-voltage terminal. The function of the head fitting is the mechanical termination of the high-voltage bushing at its high-voltage terminal, and the constitution of an electrical connection between the inner conductor and a high-voltage line which is to be connected to the high-voltage bushing (for example, an overhead line). The head fitting is preferably formed of a metal. According to one preferred form of embodiment of the invention, the head fitting incorporates external power contact means, which are integrated in the housing. The function of the external power contact means is the constitution of an electrical connection between the head fitting and the high-voltage line. In the simplest case, the external power contact means comprise a bar of an electrically conductive material. Alternatively, a thread can be provided, which is configured on the external housing. Correspondingly, on the high-voltage line which is to be connected, means are provided for the constitution of a screw connection with said thread. Preferably, the head fitting further comprises internal power contact means, which are integrated in the housing. The function of the internal power contact means is the constitution of an electrical connection between the head fitting and the inner conductor. For example, the internal power contact means can comprise contact blades, which are arranged on the inner side of an internal recess in the head fitting. The internal recess is configured for the accommodation of the section of the inner conductor which is brought out of the insulating body. If both internal and external power contact means are provided on the head fitting, the electrical connection between the inner conductor and the high-voltage line which is to be connected is thus entirely constituted by means of the head fitting. Accordingly, it is not necessary for the inner conductor to be brought out of the housing.

The function of the secondary insulation is the further insulation of the inner conductor and the further sealing of an interspace between the insulating body and the external housing. The secondary insulation is appropriately injected into the interspace, further to the assembly of the high-voltage bushing, via the filling duct. The secondary insulation preferably comprises a polyurethane foam. The polyurethane foam is a dry foam, which shows particularly good insulating properties. The polyurethane foam can be foamed, by methods which are known to a person skilled in the art, by means of a gas, for example SF6 or nitrogen, and injected thereafter into the interspace.

According to a further form of embodiment of the invention, the insulating body incorporates capacitive control inserts, which are separated from one another by insulating layers. The insulating layers can comprise a non-woven fabric. Appropriately, the control inserts are arranged concentrically around the inner conductor, and extend into the plug-in section. The function of the capacitive control inserts is the capacitive field control of the electric field of the high-voltage bushing during the operation thereof. The control inserts extend into the plug-in section of the high-voltage bushing. In this manner, the electric field can also be effectively controlled in the plug-in region, such that the sensitive region of the connection between the device connection part and the high-voltage bushing shows improved electrical properties. In-house investigations have shown that the use of insulating layers of non-woven fabric produces control inserts of a more consistent surface area than that associated with the corresponding use of paper. Consistency of the surface area of control inserts results in improved field control, associated with the reduction of field elevations on the control inserts. A further improvement in the electrical properties of the high-voltage bushing is thus achieved. In the insertable high-voltage bushing, this advantage is of particular significance, as consistent field control in the plug-in section of the high-voltage bushing is of particular importance to the achievement of the requisite dielectric withstand in this restricted assembly space. The non-woven fabric can be constituted, for example, of fibers or filaments of any length, specifically of a finite length, or can incorporate the latter. It is also conceivable for the non-woven fabric to comprise "endless filaments". The term endless filaments describes fibers of unlimited length. The non-woven fabric can be, for example, a plastic non-woven fabric, preferably a synthetic plastic non-woven fabric. A plastic non-woven fabric is characterized by plastic fibers which constitute the non-woven material. One advantage of the employment of the non-woven fabric is provided in that the non-woven fabric prevents, or can at least reduce, any penetration of moisture into the insulating body of the high-voltage bushing. The dielectric properties, for example the dissipation factor of the high-voltage bushing, can be improved accordingly. The non-woven fabric preferably comprises a water-repellent base material, such that the penetration of moisture into the insulating body is prevented. Moisture would result in an increase in the dissipation factor of the high-voltage bushing. The base material is preferably initially configured as a flexible winding layer which, during the manufacture of the high-voltage bushing, is wound about the inner conductor. The winding is then immersed in a liquid resin, which is subsequently cured. The non-woven fabric is preferably comprised of a synthetic polymer. The synthetic polymer can be, for example, a polyester, wherein a polyethylene terephthalate (PET) is specifically preferred. Synthetic polymers are apolar, and are thus moisture-repellent.

According to one form of embodiment of the invention, a radial distance between the control inserts lies between 1 mm and 3 mm, wherein a distance between 1.5 mm and 2.5 mm is specifically preferred. By means of this preferred distance, an effective discharge of the electric field can be achieved, even in consideration of any mechanical deformation sustained by the non-woven fabric insulating layers during the manufacturing process.

The insulating body preferably comprises a cured resin. For example, during the manufacturing process, the high-voltage bushing can be impregnated with a curable resin, for example after the winding of the insulating layers. After the curing of the resin, a more effectively insulated insulating body can thus be obtained. The insulating body is constituted in the form of a compact block, such that any main insulation in the form of a gas can be omitted.

The high-voltage bushing preferably extends, in the longitudinal direction, to a length of 2 m to 30 m, wherein a length between 6 m and 10 m is specifically preferred. The high-voltage bushing can thus be specifically employed, even for operating voltages in excess of 500 kV. The inner conductor can be configured as a hollow conductor or as a solid conductor. The inner conductor can be comprised, for example, of copper or aluminum.

The inner conductor preferably has an external diameter of at least 5 cm. The high-voltage bushing can thus be employed, even for operating currents in excess of 2 kA.

According to one form of embodiment of the invention, the plug-in section comprises an outer coating of a flexible insulating coating material. The outer coating can extend, for example, over a proportion of the outer surface of the plug-in section, preferably over that proportion thereof which, upon the insertion of the high-voltage bushing into the device connection part, is in contact with the latter. The coating permits a particularly effective dielectric stabilization of the joint produced upon plugging-in. The coating is preferably comprised of silicone.

According to one form of embodiment of the invention, the high-voltage bushing can comprise a damping chamber, which at least partially encloses the insulating body, and which is filled with an electrically insulating damping medium for damping the action of an external mechanical force upon the insulating body. To this end, the high-voltage bushing can comprise, for example, a first inner tube and a second outer tube, which is arranged with a clearance to the first tube, which are respectively arranged concentrically to the inner conductor and at least partially delimit the damping chamber. The inner tube can be constituted by the housing element. The damping chamber thus assumes an essentially cylindrical shape, wherein the cylinder which is delimited by the two concentric tubes encloses the insulating body. The action of an external mechanical force upon the high-voltage insulator, under certain circumstances, causes the deformation of the outer tube of the two tubes, thus absorbing a proportion of the energy associated with the action of said force. The residual force can be at least partially, and preferably entirely absorbed by the damping medium. The original point force is advantageously distributed within the damping chamber, such that said force no longer acts upon a single point of the inner tube of the two tubes, but is distributed over a surface. In this manner, the risk of severe deformation, or even a failure of the housing element can be minimized. The insulating body, which is shielded by the damping chamber, remains substantially undamaged, and substantially maintains its insulating capability. In this manner, additional protection against the action of a mechanical force is provided.

The invention further relates to an electrical device having a fluid-tight housing and a high-voltage bushing.

A device of this type is known from the above-mentioned DE 10 2007 022 641 A1.

The object of the invention is the provision of a device of this type having an increased dielectric withstand.

This object is fulfilled by a generic electrical device, wherein the high-voltage bushing is a high-voltage bushing having an inner conductor which extends in a longitudinal direction between a high-voltage terminal and a plug-in section of the high-voltage bushing, the plug-in section is configured to plug the high-voltage bushing into a device connection part of an electrical device, an insulating body at least partially surrounds the inner conductor, and a housing at least partially surrounds the insulating body to the exterior. The housing includes a tubular housing element, which extends between the high-voltage terminal of the high-voltage bushing and a mounting flange for mounting the high-voltage bushing on a device housing of the electrical device, the housing element is formed of a composite material, and a secondary insulation is provided between the housing element and the insulating body, which includes a dry foam. A device connection part is provided for the accommodation and contact-connection of the high-voltage bushing.

The advantages of the electrical device according to the invention particularly proceed from the above-mentioned advantages of the high-voltage bushing according to the invention.

The device connection part is preferably fastened to the device housing by means of a fastening section, from which a hollow locating section of an electrically non-conductive insulating material extends into the housing wherein, at a closed and tapered end region, a metallic contact part is arranged, which extends through the insulating material of the locating section, or prolongs the latter in the direction of the closed end region. According to this embodiment of the invention, each device connection part comprises an exposed end, approximately at the height of a housing cover of the device housing of the electrical device, which permits the plugging-in of the plug-in section of the high-voltage bushing. In the plug-in direction, a locating section extends from the fastening section of the device connection part into the interior of the device housing, wherein the locating section is formed of an insulating material which provides the requisite insulation between the contact piece which, in service, assumes a high-voltage potential, and the device housing of the electrical device, for example of a transformer, which lies at a ground potential. In order to provide the requisite dielectric withstand at this point, the locating section and the plug-in section are configured with mutually complementary shaping such that, with the assistance of the inherent weight of the high-voltage bushing, the plug-in section is compressed securely against the inner wall of the locating section such that, in this manner, a sufficient dielectric withstand between the high-voltage bushing and the device connection part is ensured.

The contact part is preferably connected to a winding, for example a winding of a transformer, by means of a winding connection line which extends within the device housing. By the plugging of the high-voltage bushing into the device connection part, the inner conductor of the high-voltage bushing engages with the contact part, such that the high-voltage terminal of the high-voltage bushing is connected to a winding of the electrical device via the winding connection line.

According to a further form of embodiment of the invention, the winding connection line is equipped with a current sensor, for example a current converter. As the current sensor is arranged within the device housing, there is no longer any necessity for the complex integration of the current sensor in situ in the line section during assembly of the electrical device. In other words, the electrical device according to the invention can be rapidly brought into service in situ. This embodiment eliminates a complex installation operation for the current sensor. Appropriately, assembly operations are provided in the device housing, in order to permit access to the current sensor or sensors, further to the release of the insulating fluid.

The invention is described in greater detail hereinafter, with reference to the exemplary embodiments represented in FIGS. 1 to 3.

DESCRIPTION OF THE INVENTION

Figure 1:
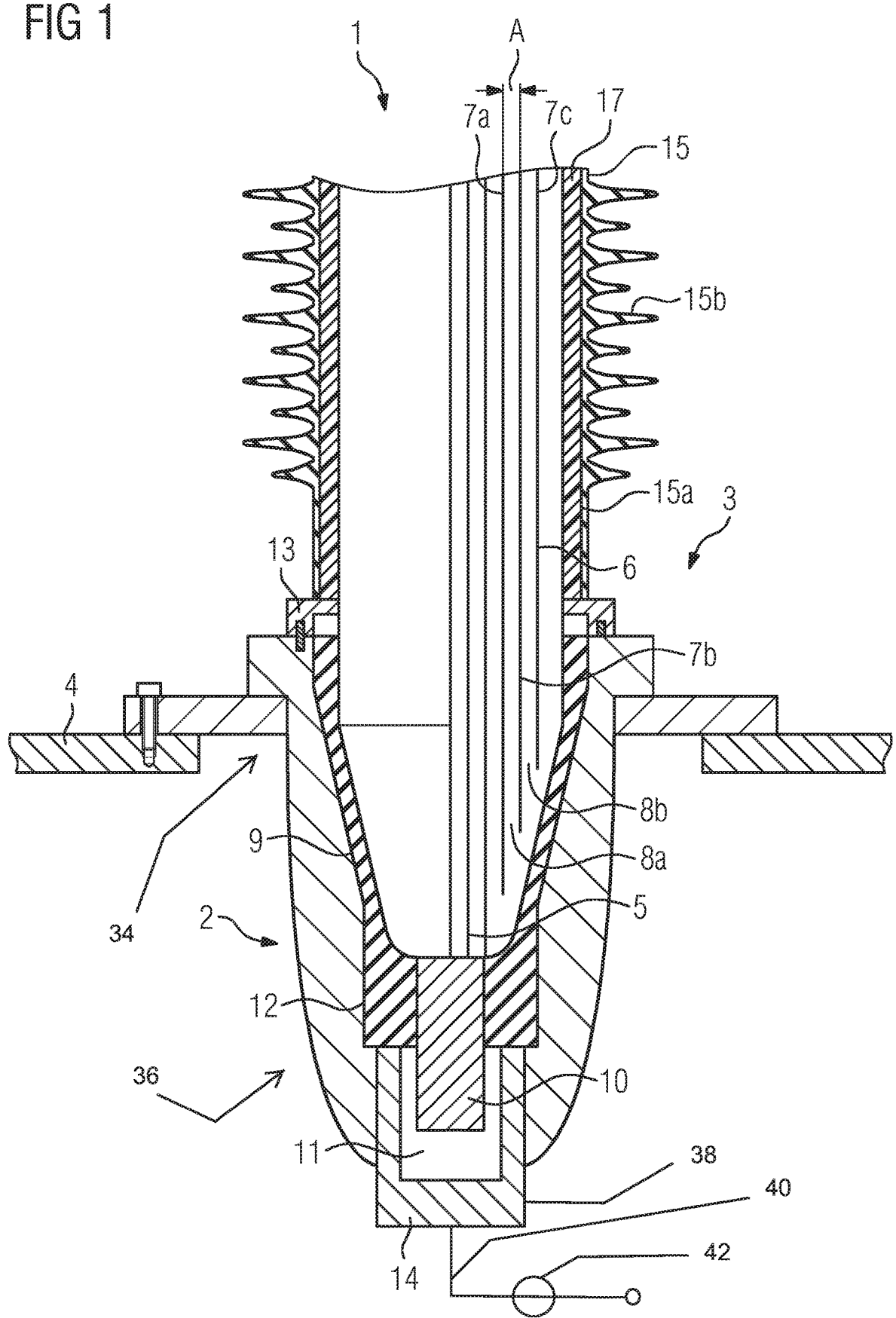
FIG. 1 shows an exemplary embodiment of a high-voltage bushing according to the invention, in a schematic partial view.

Specifically, FIG. 1 represents a partial section of an insertable high-voltage bushing 1. The high-voltage bushing, in the representation according to FIG. 1, is plugged into a device connection part 2 of a high-voltage electrical device in the form of a transformer 3. The device connection part 2 is fastened to a housing wall 4. The housing wall 4 is part of a transformer housing of the transformer 3, which is filled with an insulating medium, for example insulating oil. The fastening of the device connection part to the device housing or transformer housing is executed in an insulating medium-tight manner, such that the insulating medium cannot escape from the device housing. The device connection part 2 comprises a conductive connection part 14 for the constitution of an electrical connection between the high-voltage bushing 1 and a winding of the transformer 3, which is not represented in the figure, which is arranged within the insulating oil-filled device housing.

The high-voltage bushing 1 comprises an inner conductor 5, which is configured as a hollow conductor of aluminum or copper. The inner conductor 5 is concentrically enclosed in an insulating body 6. The insulating body 6 comprises conductive control inserts 7a-c for capacitive field control, which are concentrically wound about the inner conductor 5. The control inserts 7a-c are separated from one another by insulating layers 8a-b of a PET non-woven fabric which, further to winding about the inner conductor 5, have been impregnated with resin. The control inserts 7a-c are arranged with a radial distance A from one another of 2 mm.

The high-voltage bushing 1 further comprises a plug-in section 9 for the plugging of the high-voltage bushing 1 into the device connection part 2. The plug-in section 9 comprises a conically tapering part of the insulating body 6, and a connecting conductor section, which is welded to the inner conductor 5 in the form of a conductor bolt 10. A contact system 11 engages with the conductor bolt 10, which constitutes the electrical connection between the high-voltage bushing 1 and the transformer 3.

An interspace 12 between the plug-in section 9 of the high-voltage bushing 1 and the device connection part 2 is filled with a silicone material, which dielectrically strengthens the interspace 12. A mounting flange 13 is provided for the mounting of the high-voltage bushing 1 on the transformer 3.

The high-voltage bushing 1 further comprises a housing 15 having a housing element 15a of a glass fiber-reinforced plastic. The housing element 15a is tubular, and is arranged concentrically around the inner conductor 5. A secondary insulation 17 is arranged between the housing element 16 and the insulating body 6, which comprises a polyurethane foam.

Figure 2:
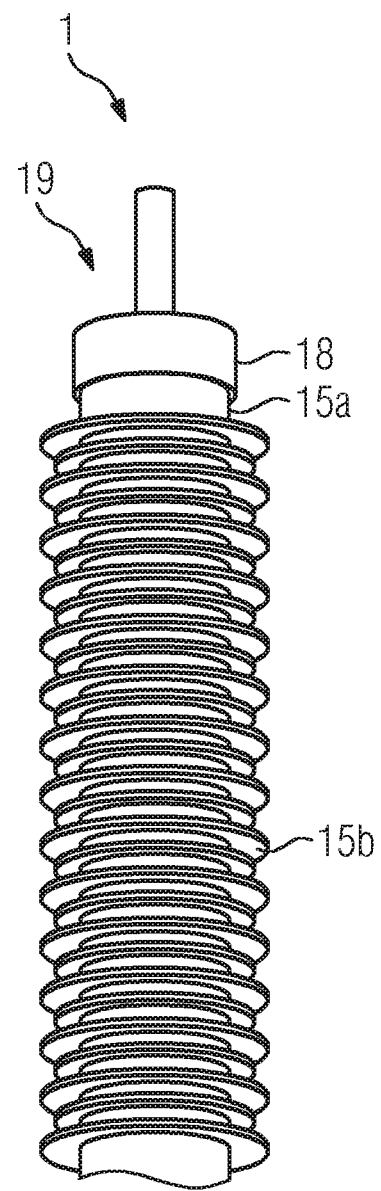
FIG. 2 shows an exemplary embodiment of the high-voltage bushing according to FIG. 1, in a further schematic partial view.

FIG. 2 represents an open air-side region of the high-voltage bushing 1. A head fitting 18 can be seen, which is configured for the mechanical termination of the high-voltage bushing 1 at its high-voltage terminal 19, and for the constitution of an electrical connection between the inner conductor 5 and an overhead line which is to be connected to the high-voltage bushing. The housing element 15a engages axially with the head fitting 18. The housing 15 further comprises an outer shielding in the form of shields 15b of silicone.

Figure 3:
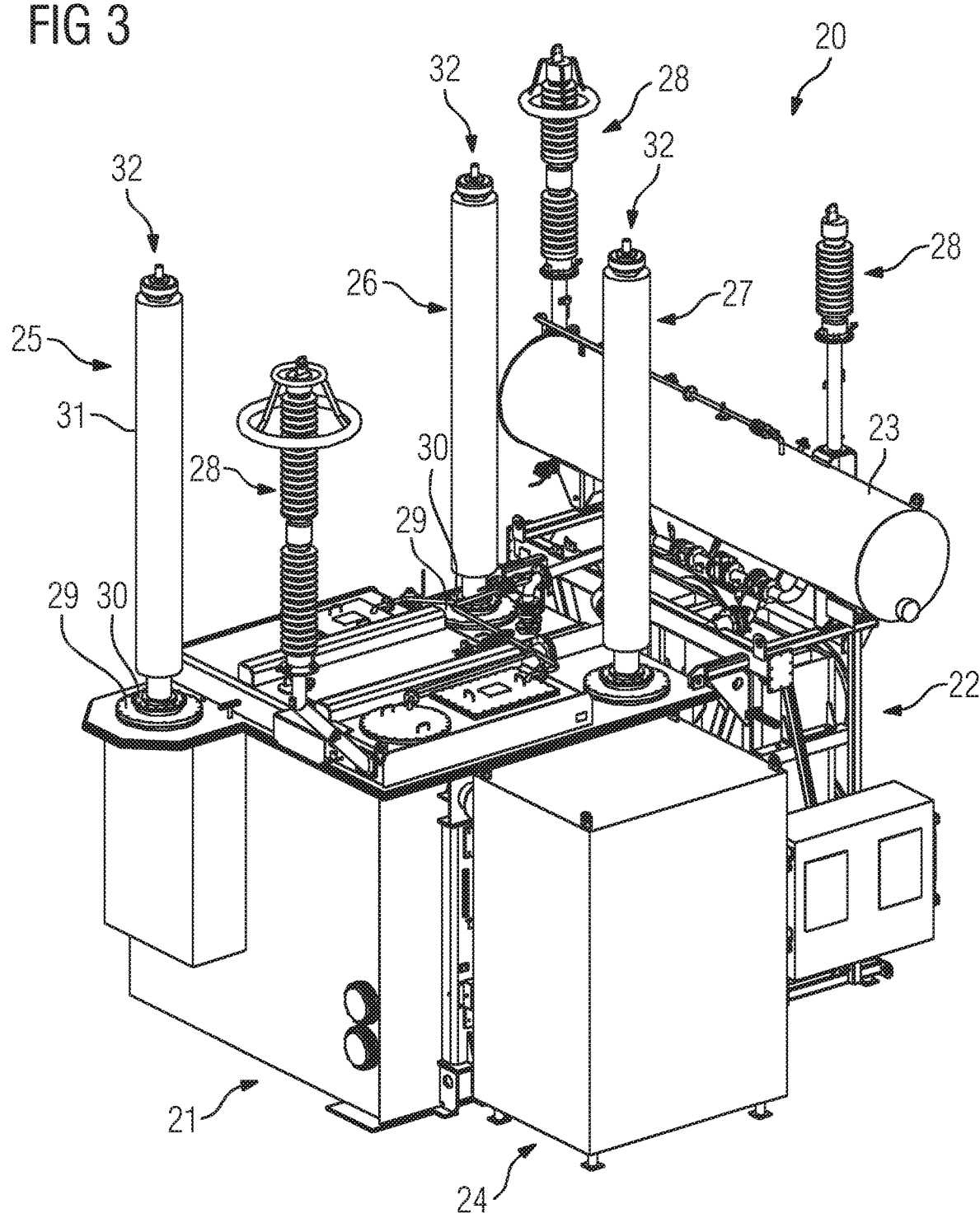
FIG. 3 shows an exemplary embodiment of the electrical device according to the invention, having a high-voltage bushing according to the invention, in a schematic perspective representation.

FIG. 3 shows a perspective view of an exemplary embodiment of an electrical device according to the invention, which is configured here as a transformer 20. The transformer 20 comprises a transformer housing 21, which is equipped with a cooling module 22, an expansion tank 23, an auxiliary current module 24 and high-voltage bushings 25-27. The above-mentioned components or modules are detachably connected to one another, and can thus be easily removed and transported in a mutually independent manner. For the protection of the high-voltage bushings 25-27, and of the active part of the transformer 20 which is arranged in the transformer housing 21, i.e. a higher-voltage winding which is connected to the high-voltage bushing 25 or 26, a lower-voltage winding which is connected to the high-voltage bushing 27, and a core of the windings, diverters 28 are provided which, within their respective diverter housing, constitute a non-linear resistance which, in the event of overvoltages, switches over from a non-conductive state to a conductive state, thereby protecting components which are parallel-connected thereto.

The high-voltage bushings 25-27 are configured as insertable high-voltage bushings and, at their plug-in section 33, can be inserted into matching device connection parts 29 of the transformer 20. The device connection parts 29 are configured to a rotationally symmetrical design, and delimit a recess, the opening of which faces the housing cover, and is configured with a complementary shaping to the respective plug-in section of the high-voltage bushing 25-27. The device connection parts 29 are moreover fastened to the transformer housing 21 in a fluid-tight manner, such that the interior or the oil reservoir of the single-phase transformer 20 is sealed from the external atmosphere in an insulating medium-tight, i.e. an air- and fluid-tight manner. At one closed end of the device connection part 29, a bolt, which is not visible in the figure, is held as a contact part which, when the high-voltage bushing 25, 26 or 27 is inserted into the respective device connection part 29, engages in conductive contact with an inner conductor which extends through the respective high-voltage bushing 25-27. Said bolt extends into the interior of the transformer housing 21, i.e. into the oil reservoir thereof, where it engages in contact with a winding connection line, which thus electrically connects the device connection part 29 to the respective lower- or higher-voltage winding of the transformer 20.

The device connection part 29 is fastened to the housing 21 by means of a fastening section 34, from which a hollow locating section 36 of an electrically non-conductive insulating material extends into the housing wherein, at a closed and tapered end region, a metallic contact part 38 is arranged, which extends through the insulating material of the locating section 36, or prolongs the latter in the direction of the closed end region.

The contact part 38 is connected to a winding by means of a winding connection line 40 which extends within the housing. The winding connection line 40 is equipped with a current sensor 42.

For the fitting and attachment of the high-voltage bushing 25, 26 or 27, each of the latter comprises a fixing terminal 30. From the fixing terminal 30, a column section 31 extends to a high-voltage terminal 32 which, in the exemplary embodiment represented in FIG. 2, is an exterior terminal.

Each high-voltage bushing 25, 26 or 27 comprises an insulating body 251, through which an inner conductor extends (c.f. FIG. 1). The insulating body incorporates conductive control inserts, which are arranged concentrically around the inner conductor. The control inserts are separated from one another by insulating layers of a synthetic plastic non-woven fabric. Further to the winding of the insulating layers and the control inserts around the inner conductor, the insulating body is impregnated with resin. A number of the control inserts extend into the plug-in section of the high-voltage bushing 25. It should be observed that the number of three control inserts represented diagrammatically in FIG. 1 is indicated for purposes of illustration only, and said number is naturally not restricted to three.

The invention claimed is:

1. An electrical device, comprising:
   a fluid-tight housing;
   an insertable high-voltage bushing including:
      a high-voltage terminal;
      a plug-in section configured to plug the high-voltage bushing into a device connection part of an electrical device;
      an inner conductor extending in a longitudinal direction between said high-voltage terminal and said plug-in section;
      an insulating body at least partially surrounding said inner conductor;
      a mounting flange for mounting the high-voltage bushing on a device housing of the electrical device;
      a housing at least partially outwardly surrounding said insulating body, said housing including a tubular housing element extending between said high-voltage terminal and said mounting flange, said housing element being formed of a composite material; and
      a secondary insulation disposed between said housing element and said insulating body, said secondary insulation including a dry foam;
   a device connection part for receiving and contact-connecting said high-voltage bushing;
   a fastening section fastening said device connection part to said housing;
   a hollow locating section of an electrically non-conductive insulating material extending from said fastening section into said housing; and
   a metallic contact part disposed at a closed and tapered end region and extending through said insulating material of said locating section or prolonging said locating section in a direction of said closed end region.

2. The electrical device according to claim 1, wherein said insulating body incorporates capacitive control inserts being separated from one another by insulating layers, said control inserts being disposed concentrically around said inner conductor and extending into said plug-in section.

3. The electrical device according to claim 2, wherein said insulating layers include a non-woven fabric.

4. The electrical device according to claim 3, wherein said non-woven fabric includes a synthetic polymer.

5. The electrical device according to claim 2, wherein said control inserts are mutually spaced apart by a radial distance of between 1 mm and 3 mm.

6. The electrical device according to claim 1, wherein said insulating body includes a cured resin.

7. The electrical device according to claim 1, wherein the high-voltage bushing extends in the longitudinal direction to a length of from 6 m to 30 m.

8. The electrical device according to claim 1, wherein said inner conductor has a diameter of at least 5 cm.

9. The electrical device according to claim 1, wherein said plug-in section includes an outer coating of a flexible insulating coating material.

10. The electrical device according to claim 1, which further comprises a winding connection line extending within said housing for connecting said contact part to a winding.

11. The electrical device according to claim 10, wherein said winding connection line is equipped with a current sensor.

* * * * *